US011957170B2

(12) United States Patent
Lee et al.

(10) Patent No.: US 11,957,170 B2
(45) Date of Patent: Apr. 16, 2024

(54) VAPORIZER AND AEROSOL GENERATING APPARATUS INCLUDING THE SAME

(71) Applicant: KT&G CORPORATION, Daejeon (KR)

(72) Inventors: Won Kyeong Lee, Guri-si (KR); Dae Nam Han, Daejeon (KR)

(73) Assignee: KT&G CORPORATION, Daejeon (KR)

( * ) Notice: Subject to any disclaimer, the term of this patent is extended or adjusted under 35 U.S.C. 154(b) by 874 days.

(21) Appl. No.: 16/968,012

(22) PCT Filed: Jun. 2, 2020

(86) PCT No.: PCT/KR2020/007158

§ 371 (c)(1),
(2) Date: Aug. 6, 2020

(87) PCT Pub. No.: WO2020/246779

PCT Pub. Date: Dec. 10, 2020

(65) Prior Publication Data

US 2023/0165308 A1 Jun. 1, 2023

(30) Foreign Application Priority Data

Jun. 4, 2019 (KR) ........................ 10-2019-0066170

(51) Int. Cl.
*A24F 40/46* (2020.01)
*A24F 40/10* (2020.01)
(Continued)

(52) U.S. Cl.
CPC .............. *A24F 40/46* (2020.01); *A24F 40/10* (2020.01); *A24F 40/44* (2020.01); *H05B 6/36* (2013.01)

(58) Field of Classification Search
CPC .......... A24F 40/46; A24F 40/10; A24F 40/44; H05B 6/36
(Continued)

(56) References Cited

U.S. PATENT DOCUMENTS 9,277,770 B2 * 3/2016 DePiano ................. A24F 40/46
9,918,495 B2 * 3/2018 DePiano ................. F22B 1/282
(Continued)

FOREIGN PATENT DOCUMENTS

CN 204232305 U 4/2015
CN 205358222 U 7/2016
(Continued)

OTHER PUBLICATIONS

Communication dated Nov. 13, 2020, from the Korean Intellectual Property Office in application No. 1020190066170.
(Continued)

*Primary Examiner* — Gary F Paumen
(74) *Attorney, Agent, or Firm* — Sughrue Mion, PLLC

(57) ABSTRACT

A vaporizer includes a storage storing a liquid aerosol generating material, a wick extending in one direction and absorbing the aerosol generating material through both end portions thereof that are connected to the storage, and a coil surrounding the wick a plurality of times at different winding intervals and heating the aerosol generating material absorbed by the wick, based on an absorption rate profile of the aerosol generating material which changes in the wick along the one direction.

6 Claims, 9 Drawing Sheets

(51) Int. Cl.
*A24F 40/44* (2020.01)
*H05B 6/36* (2006.01)

(58) Field of Classification Search
USPC .................................................. 131/328, 329
See application file for complete search history.

(56) References Cited

U.S. PATENT DOCUMENTS

| | | | | |
|---|---|---|---|---|
| 10,306,924 | B2 * | 6/2019 | DePiano | A24F 40/70 |
| 10,588,348 | B2 * | 3/2020 | Force | H05B 1/0244 |
| 2014/0270730 | A1 * | 9/2014 | DePiano | A24F 40/70 392/394 |
| 2014/0366898 | A1 | 12/2014 | Monsees et al. | |
| 2015/0013702 | A1 | 1/2015 | Liu | |
| 2015/0245659 | A1 * | 9/2015 | DePiano | B21D 53/06 392/397 |
| 2016/0143364 | A1 * | 5/2016 | DePiano | H05B 3/03 29/857 |
| 2017/0188635 | A1 | 7/2017 | Force et al. | |
| 2018/0168233 | A1 * | 6/2018 | DePiano | A24F 40/70 |
| 2018/0177236 | A1 | 6/2018 | Rosser | |
| 2018/0303164 | A1 | 10/2018 | Depiano et al. | |
| 2018/0317559 | A1 | 11/2018 | Qiu | |
| 2019/0133186 | A1 * | 5/2019 | Fraser | A24F 40/70 |
| 2020/0196667 | A1 * | 6/2020 | Force | A24F 40/44 |
| 2020/0268052 | A1 * | 8/2020 | Potter | A24F 40/46 |

FOREIGN PATENT DOCUMENTS

| | | | |
|---|---|---|---|
| CN | 107920595 | A | 4/2018 |
| KR | 10-2015-0130460 | A | 11/2015 |
| KR | 10-2016-0080550 | A | 7/2016 |
| KR | 10-2016-0127781 | A | 11/2016 |
| KR | 10-2018-0121666 | A | 11/2018 |
| WO | 2017/001818 | A1 | 1/2017 |
| WO | 2017187148 | A1 | 11/2017 |
| WO | 2018/172765 | A1 | 9/2018 |
| WO | 2019048685 | A1 | 3/2019 |

OTHER PUBLICATIONS

International Search Report dated Nov. 24, 2020, in International Application No. PCT/KR2020/007158.

Extended European Search Report dated Jan. 20, 2022 in EP App No. 20746534.5.

Office Action dated Mar. 29, 2023 in Chinese Application No. 202080001659.2.

Chinese Office Action dated Sep. 25, 2023 in Application No. 202080001659.2.

* cited by examiner

VAPORIZER AND AEROSOL GENERATING APPARATUS INCLUDING THE SAME

CROSS REFERENCE TO RELATED APPLICATIONS

This application is a National Stage of International Application No. PCT/JP2020/007158 filed Jun. 2, 2020, claiming priority based on Korean Patent Application No. 10-2019-0066170 filed Jun. 4, 2019.

TECHNICAL FIELD

One or more embodiments of the present disclosure relate to an aerosol generating apparatus and an operation method thereof.

BACKGROUND ART

Recently, the demand for alternatives to overcome the shortcomings of general cigarettes has increased. For example, there is growing demand for a method of generating aerosol by heating an aerosol generating material in cigarettes, rather than by combusting cigarettes. Accordingly, studies on a heating-type cigarette or a heating-type aerosol generating apparatus have been conducted actively.

However, in general aerosol generating apparatuses, an element for transporting an aerosol generating material, such as a wick, is often carbonized by excessively heating the wick.

DISCLOSURE

Technical Solution

A vaporizer according to an embodiment of the present disclosure may include: a storage storing a liquid aerosol generating material; a wick extending in one direction and absorbing the aerosol generating material through both end portions thereof that are connected to the storage; and a coil surrounding the wick a plurality of times at different winding intervals and heating the aerosol generating material absorbed by the wick, based on an absorption rate profile of the aerosol generating material which changes in the wick along the one direction.

Advantageous Effects

According to an embodiment of the present disclosure, since the arrangements of a heating element for different portions of the wick are determined based on the degree of absorption of the aerosol generating material at each portion of the wick, heating intensity may be optimized to properly regulate the amount of aerosol production and carbonization of the wick is prevented.

Embodiments of the present disclosure are not limited thereto. It is to be appreciated that other embodiments will be apparent to those skilled in the art from a consideration of the specification and the accompanying drawings of the present disclosure described herein.

BEST MODE

Figure 1:
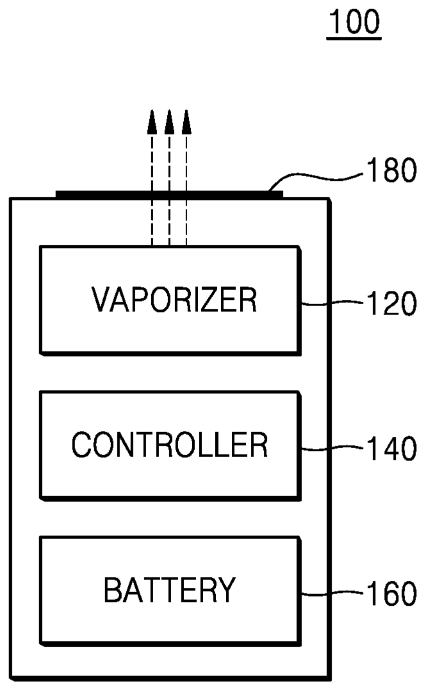
FIG. 1 is a diagram of an aerosol generating apparatus including a vaporizer according to an embodiment of the present disclosure.

According to an aspect of the present disclosure, a vaporizer may include: a storage storing a liquid aerosol generating material; a wick extending in one direction and absorbing the aerosol generating material through both end portions thereof that are connected to the storage; and a coil surrounding the wick a plurality of times at different winding intervals and heating the aerosol generating material absorbed by the wick, based on an absorption rate profile of the aerosol generating material which changes in the wick along the one direction Winding intervals at the center portion of the wick may be longer than the winding intervals of the coil at both end portions of the wick such that heating intensity at the center portion of the wick is lower than heating intensity at the both end portions of the wick.

The winding intervals at the center portion of the wick may be 1.3 times to 1.5 times longer than the winding intervals of the coil at both ends of the wick.

The coil may surround a center portion of the wick at first winding intervals and surround other portions of the wick at second winding intervals longer than the first winding intervals, and the first winding intervals may have 0.6 times to 4 times the frequency of occurrence of the second winding intervals.

The coil may heat the inside of the wick by surrounding the wick at both end portions of the wick and penetrate the wick at the center portion of the wick.

Alternatively, the coil may heat the inside of the wick by surrounding the wick at both end portions of the wick and be arranged within the wick at the center portion of the wick.

According to another aspect of the present disclosure, an aerosol generating apparatus may include: a storage storing a liquid aerosol generating material; a vaporizer including a wick extending in one direction and absorbing the aerosol generating material through both end portions thereof that are connected to the storage and a coil surrounding the wick a plurality of times at different winding intervals and heating the aerosol generating material absorbed by the wick, based on an absorption rate profile of the aerosol generating material which changes in the wick along the one direction; a battery supplying electric power to the vaporizer; and a controller controlling the electric power supplied to the vaporizer from the battery.

MODE FOR INVENTION

With respect to the terms used to describe the various embodiments, general terms which are currently and widely used are selected in consideration of functions of structural elements in the various embodiments of the present disclosure. However, meanings of the terms can be changed according to intention, a judicial precedence, the appearance of new technology, and the like. In addition, in certain cases, a term which is not commonly used can be selected. In such a case, the meaning of the term will be described in detail at the corresponding portion in the description of the present disclosure. Therefore, the terms used in the various embodiments of the present disclosure should be defined based on the meanings of the terms and the descriptions provided herein.

In addition, unless explicitly described to the contrary, the word "comprise" and variations such as "comprises" or "comprising" will be understood to imply the inclusion of stated elements but not the exclusion of any other elements. In addition, the terms "-er", "-or", and "module" described in the specification mean units for processing at least one function and/or operation and can be implemented by hardware components or software components and combinations thereof.

As used herein, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

It will be understood that when an element or layer is referred to as being "over," "above," "on," "connected to" or "coupled to" another element or layer, it can be directly over, above, on, connected or coupled to the other element or layer or intervening elements or layers may be present. In contrast, when an element is referred to as being "directly over," "directly above," "directly on," "directly connected to" or "directly coupled to" another element or layer, there are no intervening elements or layers present. Like numerals refer to like elements throughout.

Hereinafter, the present disclosure will now be described more fully with reference to the accompanying drawings, in which exemplary embodiments of the present disclosure are shown such that one of ordinary skill in the art may easily work the present disclosure. The disclosure may, however, be embodied in many different forms and should not be construed as being limited to the embodiments set forth herein.

FIG. 1 is a diagram of an aerosol generating apparatus 100 including a vaporizer 120 according to an embodiment of the present disclosure.

Referring to FIG. 1, the aerosol generating apparatus 100 may include a vaporizer 120, a battery 160, and a controller 140. However, internal structure of the aerosol generating apparatus 100 is not limited to the illustration of FIG. 1. It will be apparent to those skilled in the art that depending on a design of the aerosol generating apparatus 100, some of hardware components may be omitted or new components, such as a heater, a sensor, a user interface, and the like may be added therein.

Hereinafter, without limiting a space in which each component included in the aerosol generating apparatus 100 is arranged, operation of each component will be described.

The vaporizer 120 is configured to store an aerosol generating material and heat the aerosol generating material to generate vaporized aerosol. The vaporizer 120 may include a wick 122 and a storage 121 (see FIG. 2). The aerosol generating material accommodated in the storage 121 is absorbed by the wick 122, and the heater may heat the aerosol generating material absorbed by the wick 122 to generate aerosol. The generated aerosol moves along an airflow path and may be inhaled by a user through a mouthpiece 180. The vaporizer 120 may be referred to as a cartomizer.

According to an embodiment, the vaporizer 120 is a cartridge capable of being inserted into and detached from the aerosol generating apparatus 100. When the aerosol generating material stored in the vaporizer 120 is completely consumed, the vaporizer 120 may be refilled with the aerosol generating material or may be replaced with another vaporizer 120 storing the aerosol generating material. The vaporizer 120 will be described in greater detail later, with reference to FIG. 2.

The battery 160 may supply power to be used for the aerosol generating device 100 to operate. For example, the battery 160 may supply power for heating the heater. In addition, the battery 160 may supply power required for operation of other hardware components included in the aerosol generating device 100, such as a sensor, a user interface, a memory, and the controller 140, etc. The battery 160 may be a rechargeable battery or a disposable battery. For example, the battery 160 may be a lithium polymer (LiPoly) battery, but is not limited thereto.

The controller 140 is a hardware component configured to control overall operations of the aerosol generating device 100. The controller 140 may include at least one processor. A processor can be implemented as an array of a plurality of logic gates or can be implemented as a combination of a microprocessor and a memory in which a program executable in the microprocessor is stored. It will be understood by one of ordinary skill in the art that the processor can be implemented in other forms of hardware.

The controller 140 may analyzes a result of the sensing by at least one sensor, and controls processes that are to be performed subsequently. The controller 140 may control power supplied to the heater so that the operation of the heater is started or terminated, based on the result of the sensing by the at least one sensor. In addition, based on the result of the sensing by the at least one sensor, the controller 140 may control the amount of power supplied to the heater and the time at which the power is supplied, so that the heater is heated to or maintained at an appropriate temperature.

In an embodiment, the controller 140 may set a mode of the heater to a pre-heating mode to start the operation of the heater after receiving a user input to the aerosol generating device 100. In addition, the controller 140 may switch the mode of the heater from the pre-heating mode to an operation mode after detecting a user's puff by using the puff detecting sensor. In addition, the controller 140 may stop supplying power to the heater when the number of puffs reaches a preset number after counting the number of puffs by using the puff detecting sensor.

The controller 140 may control the user interface based on the result of the sensing by the at least one sensor. For example, when the number of puffs reaches the preset number after counting the number of puffs by using the puff detecting sensor, the controller 140 may notify the user by using at least one of a light emitter, a motor or a speaker that the aerosol generating device 100 will soon be terminated.

Although not illustrated in FIG. 1, the aerosol generating device 100 may include at least one sensor. A result sensed by the at least one sensor is transmitted to the controller 140, and the controller 140 may control the aerosol generating device 100 to perform various functions such as controlling the operation of the heater, restricting smoking, determining whether a cigarette (or a cartridge) is inserted, and displaying a notification.

For example, the at least one sensor may include a puff detecting sensor. The puff detecting sensor may detect a user's puff based on any one of a temperature change, a flow change, a voltage change, and a pressure change.

In addition, the at least one sensor may include a temperature sensor. The temperature sensor may detect a temperature at which the heater (or an aerosol generating material) is heated. The aerosol generating device 100 may include a separate temperature sensor for sensing a temperature of the heater, or the heater itself may serve as a temperature sensor instead of including a separate temperature sensor.

At least one sensor may include a position change detection sensor. The position change detection sensor may acquire information regarding a posture of the user holding the aerosol generating apparatus 100 and the user's intention to smoke by detecting a change in tilt and acceleration of the aerosol generating apparatus 100.

Although not illustrated in FIG. 1, the aerosol generating device 100 may include a user interface. The user interface may provide the user with information about the state of the aerosol generating device 100. The user interface may include various interfacing devices, such as a display or a light emitter for outputting visual information, a motor for outputting haptic information, a speaker for outputting sound information, input/output (I/O) interfacing devices (for example, a button or a touch screen) for receiving information input from the user or outputting information to the user, terminals for performing data communication or receiving charging power, and communication interfacing modules for performing wireless communication (for example, Wi-Fi, Wi-Fi direct, Bluetooth, near-field communication (NFC), etc.) with external devices. However, the aerosol generating device 100 may be implemented by selecting only some of the above-described various interfacing devices.

Although not illustrated in FIG. 1, the aerosol generating device 100 may include a memory. The memory may be a hardware component configured to store various pieces of data processed in the aerosol generating device 100, and the memory may store data processed or to be processed by the controller 140. The memory may include various types of memories, such as dynamic random access memory (DRAM), static random access memory (SRAM), read-only memory (ROM), electrically erasable programmable read-only memory (EEPROM), etc.

The memory may store an operation time of the aerosol generating device 100, the maximum number of puffs, the current number of puffs, at least one temperature profile, data on a user's smoking pattern, etc.

Although not illustrated in FIG. 1, an aerosol generating system may be configured by the aerosol generating device 100 and a separate cradle. For example, the cradle may be used to charge the battery 160 of the aerosol generating device 100. For example, the aerosol generating device 100 may be supplied with power from a battery of the cradle to charge the battery 160 of the aerosol generating device 100 while being accommodated in an accommodation space of the cradle.

Figure 2:
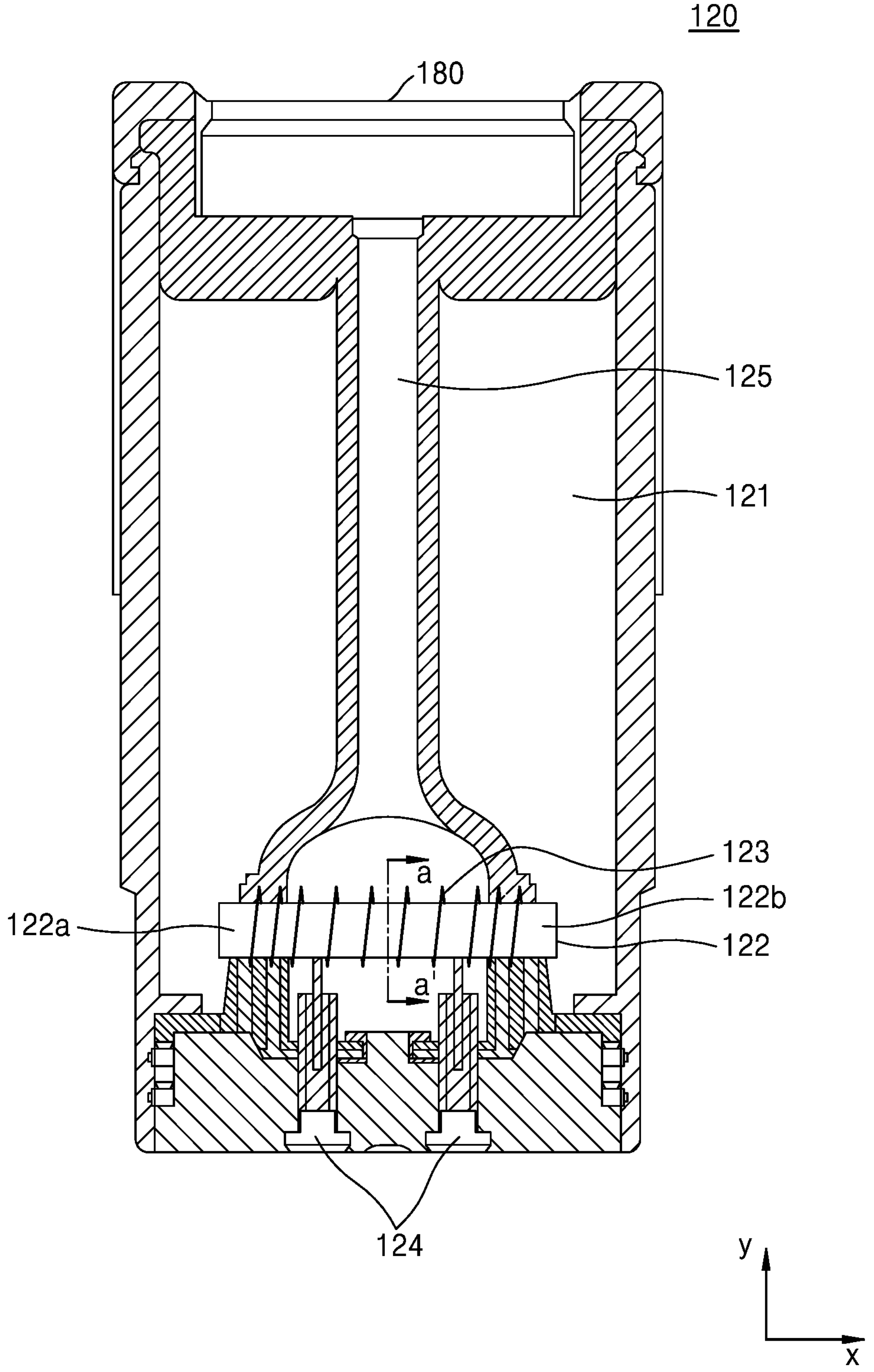
FIG. 2 is a cross-sectional view of a vaporizer according to an embodiment of the present disclosure.

FIG. 2 is a cross-sectional view of the vaporizer 120 according to an embodiment of the present disclosure. The vaporizer 120 may include the storage 121, the wick 122, a heating element 123, an aerosol discharge passage 125, and the like, but the elements of the vaporizer 120 are not limited thereto.

The storage 121 includes a housing and an empty space surrounded by the housing. An aerosol generating material may be stored in the empty space of the storage 121. The storage 121 may be sealed to prevent the aerosol generating material from leaking out of the storage 121 through a path other than the wick 122.

The storage 121 may be manufactured in various shapes. For example, the storage 121 may have a cylindrical or rectangular parallelepiped shape extending in one direction according to an embodiment.

The storage 121 may be connected to the wick 122, and the aerosol generating material of the storage 121 may be transported out of the storage 121 through the wick 122. The storage 121 may include a plurality of openings connected to both end portions 122*a* and 122*b* of the wick 122. The openings of the storage 121 and the wick 122 connected to the openings are hermetically sealed to prevent a leakage of the aerosol generating material.

The wick 122 may be connected to the storage 121 to transfer the aerosol generating material stored in the storage 121 to a vaporization chamber and the heating element 123 in the vaporization chamber.

The wick 122 may include a hygroscopic fiber that absorbs the aerosol generating material in liquid or gel. The wick 122 may transport the aerosol generating material by absorbing the aerosol generating material through an end portion connected to the storage 121. Alternatively, according to an embodiment, the wick 122 has a thin tube shape and may transport the aerosol generating material through the inside of the tube using a capillary phenomenon.

The wick 122 may be in various shapes. For example, the wick 122 may have an elongated shape extending in one direction. Both of the end portions 122*a* and 122*b* of the wick 122 may be connected to the storage 121 to absorb the aerosol generating material. The wick 122 absorbs the aerosol generating material through its end portions 122*a* and 122*b* and may transport the aerosol generating material to a center portion of the wick 122.

The heating element 123 may generate vaporized aerosol by heating the aerosol generating material of the wick 122. When the temperature becomes equal to or higher than a vaporization temperature of the aerosol generating material by the heating element 123, the aerosol generating material may be vaporized to generate aerosol.

The heating element 123 may be arranged to heat one or more areas of the wick 122. As shown in FIG. 2, the heating element 123 may include a coil 123 surrounding the wick 122. The heating element 123 may surround the wick 122 along a direction in which the wick 122 extends.

As the heating element 123 surrounds the wick 122, the heating element 123 may form a plurality of rings along a circumferential direction of the wick 122. Winding intervals, which are intervals between the rings of the heating element 123, may differ along a lengthwise direction of the wick 122. This will be described in greater detail herein below with reference to FIGS. 4 to 6.

The heating element 123 may surround a surface of the wick 122 and/or penetrate the wick 122. Thus, the heating element 123 may effectively heat the aerosol generating material in the wick 122. This will be described in greater detail herein below with reference to FIGS. 7 to 10.

The heating element 123 may be formed of any suitable electrically resistive material. For example, the suitable electrically resistive material may include metal, such as titanium, zirconium, tantalum, platinum, nickel, cobalt, chromium, hafnium, niobium, molybdenum, tungsten, tin, gallium, manganese, iron, copper, stainless steel, nichrome, and the like or a metal alloy. However, embodiments of the present disclosure are not limited thereto. Alternatively, the heating element 123 may be implemented with a metal heating wire, a metal heating plate on which an electrical conductive track is arranged, a ceramic heating element, and the like. However, embodiments of the present disclosure are not limited thereto.

The vaporization chamber is a space in which the aerosol generating material is vaporized to generate aerosol. For example, the vaporization chamber is a space in which the heating element 123 is wound around the wick 122. The aerosol generating material of the storage 121 may be transported to the vaporization chamber through the wick 122. The vaporization chamber is connected to an aerosol generating material discharge passage, and the generated aerosol may move through the vaporization chamber.

The vaporization chamber may be a space surrounded by an outer wall that maintains heat generated from the heating element 123 in the vaporization chamber. The vaporization chamber may maintain airtightness so that heat does not transfer outside the aerosol discharge passage 125. As a result, heating efficiency in the vaporization chamber may be increased.

The vaporized aerosol may be released through the aerosol discharge passage 125. The mouthpiece 180 is arranged at one end of the aerosol discharge passage 125.

The vaporizer 120 may include a terminal 124. The vaporizer 120 may receive electric power from the battery 160 through the terminal 124 and transfer the electric power to the heating element 123. When the vaporizer 120 is coupled to the battery 160, the terminal 124 may be electrically connected to the battery 160. The end portions of the heating element 123 may extend to be electrically connected to the terminal 124.

Figure 3A:
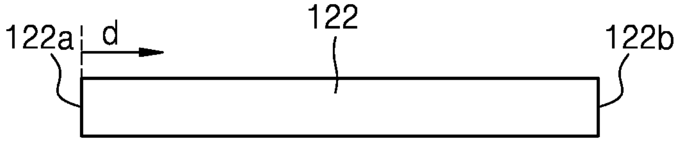
FIGS. 3A and 3B are diagrams of an aerosol generating material absorption profile along a lengthwise direction of a wick according to an embodiment of the present disclosure.
Figure 3B:
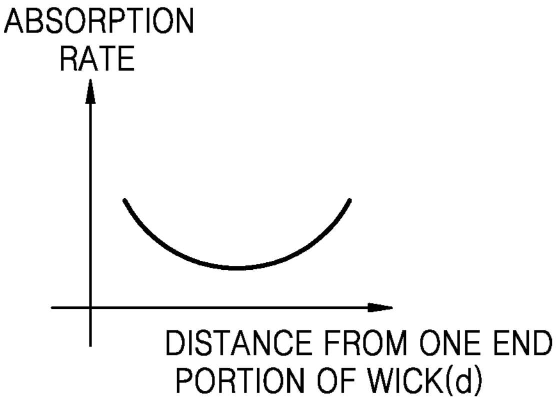

FIGS. 3A and 3B are diagrams of an aerosol generating material absorption profile along a lengthwise direction of the wick 122 according to an embodiment.

Referring to FIG. 3A, the wick 122 absorbs an aerosol generating material through its end portions 122*a* and 122*b* and transports the aerosol generating material to the center portion of the wick 122. A direction indicated by an arrow (and also its opposite direction) corresponds to a lengthwise direction of the wick 122. A rate at which the aerosol generating material is absorbed may vary according to the distance (d) from one end portion 122*a* of the wick 122.

Referring to FIG. 3B, the rate at which the aerosol generating material is absorbed is high at both end portions 122*a* and 122*b* of the wick 122. Both end portions 122*a* and 122*b* of the wick 122 are connected to the storage 121 to directly receive the aerosol generating material. When the aerosol generating material in the wick 122 is vaporized after a puff, the wick 122 becomes a dry state. When the wick 122 is in a dry state, both end portions 122*a* and 122*b* of the wick 122 may absorb the aerosol generating material at a high rate.

On the other hand, the aerosol generating material absorption rate at the center portion of the wick 122 may be lower than the aerosol generating material absorption rate at both end portions 122*a* and 122*b* of the wick 122. Since the center portion of the wick 122 is spaced apart from the storage 121, it takes a longer time for the aerosol generating material to reach the center portion of the wick 122 than to reach both end portions 122*a* and 122*b* of the wick 122.

Looking at micro-sections constituting the wick 122 along a lengthwise direction of the wick 122, aerosol may be absorbed according to the difference of a degree to which the aerosol generating material has been absorbed at both end portions of each micro-section. In this regard, the closer to the center portion of the wick 122 from an end portion of the wick 122, the lower the difference value of the degree to which the aerosol generating material has been absorbed at both end portions of each micro-section. In other words, the closer to the center portion of the wick 122 from both end portions 122*a* and 122*b* of the wick 122, the lower the aerosol generating material absorption rate.

Figure 4:
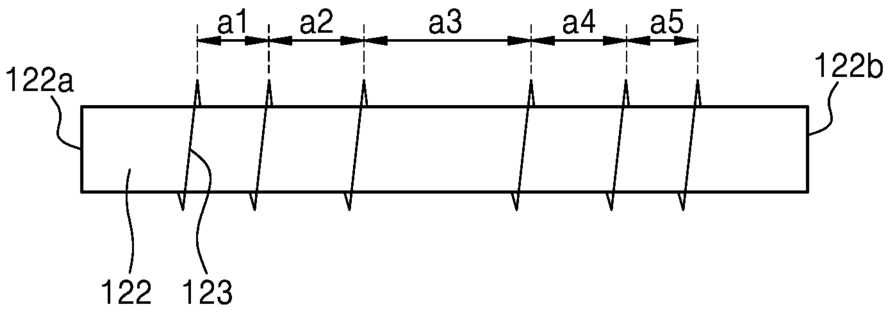
FIGS. 4, 5, and 6 are diagrams of a wick and a heating element according to embodiments of the present disclosure.
Figure 5:
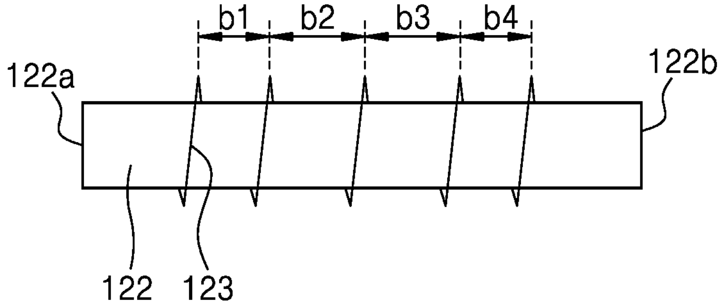
Figure 6:
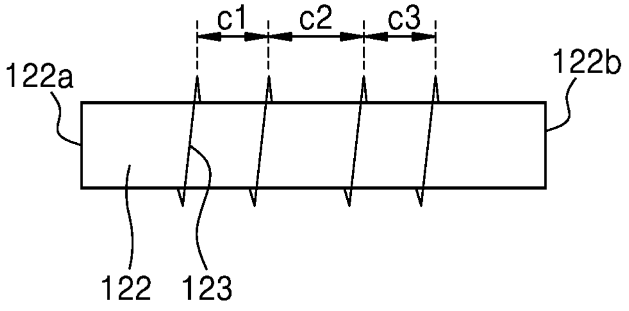

FIGS. 4, 5, and 6 are diagrams of the wick 122 and the heating element 123 according to embodiments of the present disclosure. As described above with reference to FIGS. 3A and 3B, the absorption rate of the aerosol generating material is different between the end portions 122*a* and 122*b* and at the center portion of the wick 122. Accordingly, the degree to which the aerosol generating material has been absorbed is different at different portions of the wick 122.

Therefore, by heating the aerosol generating material to a suitable intensity based on the aerosol generating material absorption rate at each portion of the wick 122. As such, the degree to which the aerosol generating material is vaporized may be regulated in a consistent manner, and the carbonization of the wick 122 at the center portion may be prevented.

Specifically, the heating element 123 may reduce the heating intensity at the center portion of the wick 122 having a relatively low absorption rate of the aerosol generating material. In contrast, the heating element 123 may increase the heating intensity at both end portions 122*a* and 122*b* of the wick 122 having an aerosol generating material absorption rate higher than the center portion of the wick 122.

The heating element 123 may surround the wick 122 at different winding intervals along a lengthwise direction of the wick 122, based on the aerosol generating material absorption profile. Specifically, shorter winding intervals of the heating element 123 surrounding the wick 122 provide greater heating intensity. Conversely, the longer the winding intervals, the lesser the heating intensity. In this regard, the heating element 123 may surround the wick 122 by maintaining long winding intervals at the center portion of the wick 122 and short winding intervals at both end portions 122*a* and 122*b* of the wick 122.

The number of times the coil 123 surrounds the wick 122 is determined according to the absorption profile. In other words, the coil 123 may surround the wick 122 a preset number of times at different winding intervals, according to the absorption profile.

FIGS. 4 to 6 show embodiments in which the heating element 123 in the form of the coil 123 winds the wick 122 six times, five times, and four times, respectively. Embodiments of FIGS. 4 to 6 are merely examples, and embodiments of the present disclosure are not limited thereto. For example, the coil 123 may wind the wick 122 three times, seven times, eight times, and etc.

The winding intervals of the coil 123 may be constant or different from each other, depending on the design. For example, since the aerosol generating material is absorbed from both end portions 122*a* and 122*b* of the wick 122 toward the center portion, the winding intervals may be symmetrical with respect to the center portion of the wick 122.

FIG. 4 illustrates the coil 123 winding the wick 122 six times. In other words, FIG. 4 shows five winding intervals of the coil 123 surrounding the wick 122.

A winding interval a3 at the center portion of the wick 122 may be longer than or equal to winding intervals a2 and a4 at an intermediate portion of the wick 122. The winding intervals a2 and a4 at the intermediate portion of the wick 122 are longer than or equal to winding intervals a1 and a5 at both end portions 122*a* and 122*b* of the wick 122.

For example, the winding interval a3 at the center portion of the wick 122 may be 1.3 times to 1.5 times longer than the winding intervals a1 and a5 of the coil 123 at both end portions 122*a* and 122*b* of the wick 122. In that case, to the extent the winding intervals a2 and a4 at the intermediate portion of the wick 122 do not exceed the winding interval a3 at the center portion of the wick 122, the winding intervals a2 and a4 at the intermediate portion of the wick 122 may be 1.3 times to 1.5 times longer than the winding intervals a1 and a5 at both end portions 122*a* and 122*b* of the wick 122.

As such, the coil 123 surrounds the wick 122 a preset number of times at different winding intervals. The following examples show a relationship between the frequency of occurrence of the winding intervals a1 and a2 that are shorter than the winding interval a3 at the center portion of the wick 122 and the frequency of occurrence of the winding interval a3 at the center portion of the wick 122. However, the frequency of occurrence of the different winding intervals is not limited to the following examples. Each winding interval may appear a suitable number of times according to the aerosol generating material absorption profile.

For example, the coil 123 may be wound such that the winding interval a3 at the center portion of the wick 122 appears one time and a winding interval shorter than the winding interval a3 appears four times at other portions. In that case, the winding interval a2 at the intermediate portion of the wick 122 and the winding interval a1 at both end portions 122*a* and 122*b* of the wick 122 are equal to each other. As a result, the frequency of occurrence of a winding interval shorter than the winding interval a3 at the center portion of the wick 122 is four times greater than the frequency of occurrence of the winding interval a3 at the center portion of the wick 122.

As another example, the coil 123 may be wound such that the winding interval a3 at the center portion of the wick 122 appears three times and a winding interval shorter than the winding interval a3 appears twice. In that case, the winding interval a2 at the intermediate portion of the wick 122 and the winding interval a3 at the center portion of the wick are equal to each other. The winding interval shorter than the winding interval a3 at the center portion of the wick 122 has 0.67 times the frequency of occurrence of the winding interval a3 at the center portion of the wick 122.

FIG. 5 illustrates the coil 123 winding the wick 122 five times. In other words, FIG. 5 shows four winding intervals of the coil 123 surrounding the wick 122.

Winding intervals b2 and b3 at the center portion of the wick 122 may be longer than or equal to winding intervals b1 and b4 at both end portions 122*a* and 122*b* of the wick 122. For example, the winding intervals b2 and b3 at the center portion of the wick 122 may be 1.3 times to 1.5 times longer than the winding intervals b1 and b4 at both end portions 122*a* and 122*b* of the wick 122. Depending on symmetry, the winding interval b2 and the winding interval b3 may be equal to each other and the winding interval b1 and the winding interval b4 may be equal to each other.

As aforementioned, the coil 123 may surround the wick 122 a preset number of times at different winding intervals. For example, the coil 123 is wound such that the winding intervals b2 and b3 at the center portion of the wick 122 appear twice and the winding intervals b1 and b4 shorter than the winding intervals b2 and b3 appear twice. In this case, the frequency of occurrence of a winding interval shorter than the winding intervals b2 and b3 is equal to the frequency of occurrence of the winding intervals b2 and b3 at the center portion of the wick 122.

FIG. 6 illustrates the coil 123 winding the wick 122 four times. In other words, FIG. 6 shows three winding intervals of the coil 123 surrounding the wick 122.

A winding interval c2 at the center portion of the wick 122 may be longer than or equal to winding intervals c1 and c3 at both end portions 122*a* and 122*b* of the wick 122. For example, the winding interval c2 at the center portion of the wick 122 may be 1.3 times to 1.5 times longer than the winding intervals c1 and c3 at both end portions 122*a* and 122*b* of the wick 122. Depending on symmetry, the winding interval c1 and the winding interval c3 may be equal to each other.

As aforementioned, the coil 123 may surround the wick 122 a preset number of times at different winding intervals. For example, the coil 123 may be wound such that the winding interval c2 at the center portion of the wick 122 appears once and the winding intervals c1 and c3 shorter than the winding interval c2 appear twice. In this case, the frequency of occurrence of a winding interval shorter than the winding interval c2 at the center portion of the wick 122 is twice greater than the frequency of occurrence of the winding interval c2 at the center portion of the wick 122.

Figure 7:
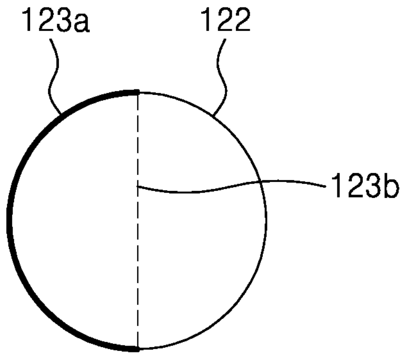
FIGS. 7, 8, and 9 are diagrams of a wick and a heating element according to embodiments of the present disclosure.
Figure 8:
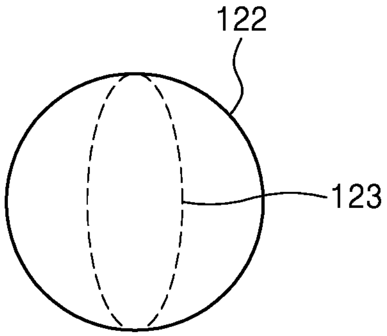
Figure 9:
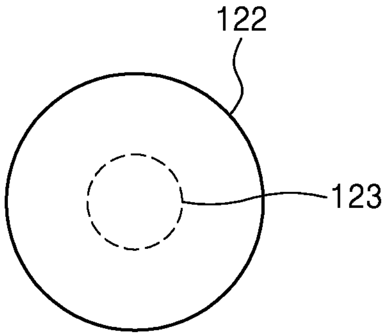

FIGS. 7, 8, and 9 are diagrams of the wick 122 and the heating element 123 according to embodiments of the present disclosure. FIGS. 7, 8, and 9 are diagrams showing an example of a cross-section of the wick 122 according to the cutting line a-a' of FIG. 2. However, the cross-section of the wick 122 is not limited thereto. For example, the cross-section of the wick 122 may have a different shape, such as an oval, a polygon, and the like.

Depending on the distance from a center point of the cross-section of the wick 122, the amount of the aerosol generating material absorbed and retained by the wick 122 may differ. The aerosol generating material is easily vaporized on a surface of the wick 122 by airflow passing through the wick 122. In addition, the aerosol generating material absorbed by the wick 122 tends to converge to a center point within the wick 122 by attraction of each other. As such, a surface of the wick 122 tends to be drier than the inside of the wick 122 and the inside of the wick 122 tends to be wet, in comparison.

The heating element 123 may increase the amount of vaporized aerosol generating material by heating not only the surface of the wick 122 but also the inside of the wick 122. According to an embodiment, coil may surround a surface of the wick at both end portions of the wick and also heat the inside of the wick at the center portion.

Referring to FIG. 7, one portion 123*a* of the heating element 123 winds the wick 122 along a surface of the wick 122, and another portion 123*b* of the heating element 123 may penetrate the wick 122. For example, as illustrated in FIG. 7, the portion 123*b* of the heating element 123 may penetrate an upper portion of the wick 122 to enter the wick 122. However, embodiments of the present disclosure are not limited thereto.

The portion 123*b* of the heating element 123 may effectively heat the aerosol generating material absorbed by the wick 122. The portion 123*b* of the heating element 123 may be arranged in the form of a straight line or a curve in the wick 122 and may be arranged according to a certain pattern for increasing heating efficiency.

Meanwhile, the portion 123*a* of the heating element 123 may heat the aerosol generating material at a surface of the wick 122. Therefore, the heating element 123 may heat both the surface of the wick 122 and the inside of the wick 122 to increase the heating efficiency and the amount of vaporized aerosol generating material.

Referring to FIGS. 8 and 9, the heating element 123 may be present in the wick 122 so that the heating element 123 may effectively heat the aerosol generating material absorbed by the wick 122. For example, the heating element 123 may be arranged in an oval or circular shape in the wick 122, but is not limited thereto. The heating element 123 may be arranged according to any other patterns that increase the heating efficiency.

As shown in FIG. 8, the heating element 123 may be arranged in an oval shape in the wick 122. In this case, a long radius of the oval may be arranged in a vertical direction according to airflow passing from a lower side of the wick 122 toward an upper side of the wick 122. According to an embodiment, the coil may surround a surface of the wick at both end portions of the wick and may also be arranged within the wick at the center portion of the wick to heat the inside of the wick.

At least one of the components, elements, modules or units (collectively "components" in this paragraph) represented by a block in the drawings such as the controller 140 and the vaporizer 120 in FIG. 1, may be embodied as various numbers of hardware, software and/or firmware structures that execute respective functions described above, according to an exemplary embodiment. For example, at least one of these components may use a direct circuit structure, such as a memory, a processor, a logic circuit, a look-up table, etc. that may execute the respective functions through controls of one or more microprocessors or other control apparatuses. Also, at least one of these components may be specifically embodied by a module, a program, or a part of code, which contains one or more executable instructions for performing specified logic functions, and executed by one or more microprocessors or other control apparatuses. Further, at least one of these components may include or may be implemented by a processor such as a central processing unit (CPU) that performs the respective functions, a microprocessor, or the like. Two or more of these components may be combined into one single component which performs all operations or functions of the combined two or more components. Also, at least part of functions of at least one of these components may be performed by another of these components. Further, although a bus is not illustrated in the above block diagrams, communication between the components may be performed through the bus. Functional aspects of the above exemplary embodiments may be implemented in algorithms that execute on one or more processors. Furthermore, the components represented by a block or processing steps may employ any number of related art techniques for electronics configuration, signal processing and/or control, data processing and the like.

While embodiments of the disclosure have been illustrated and described with reference to the accompanying drawings, it will be clear that the disclosure is not limited to these embodiments only. Numerous modifications, changes, variations, substitutions, and equivalents will be apparent to those skilled in the art, without departing from the spirit and scope of the disclosure, as described in the claims.

What is claimed is:

1. A vaporizer comprising:

a storage storing a liquid aerosol generating material;

a wick extending in one direction and absorbing the aerosol generating material through both end portions thereof that are connected to the storage; and a coil surrounding the wick a plurality of times at different winding intervals and heating the aerosol generating material absorbed by the wick, wherein at least one winding interval at a center portion of the wick is longer than winding intervals of the coil at other portions of the wick, and winding intervals of the coil at intermediate portions of the wick are longer than winding intervals of the coil at the both end portions of the wick.

2. The vaporizer of claim 1, wherein the at least one winding interval at the center portion of the wick is 1.3 times to 1.5 times longer than winding intervals at the both end portions of the wick.

3. The vaporizer of claim 1, wherein the coil surrounds the center portion of the wick at first winding intervals and surrounds the other portions of the wick at second winding intervals longer than the first winding interval, and the first winding intervals have 0.6 times to 4 times a frequency of occurrence of the second winding intervals.

4. The vaporizer of claim 1, wherein the coil penetrates a surface of the wick and heats inside of the wick by penetrating the wick.

5. The vaporizer of claim 1, wherein the coil is disposed within the wick and heats inside of the wick.

6. An aerosol generating apparatus comprising:

a vaporizer comprising:

a storage storing a liquid aerosol generating material;

a wick extending in one direction and absorbing the aerosol generating material through both end portions thereof that are connected to the storage; and a coil surrounding the wick a plurality of times at different winding intervals and heating the aerosol generating material absorbed by the wick;

a battery supplying electric power to the vaporizer; and a controller controlling the electric power supplied to the vaporizer from the battery, wherein at least one winding interval at a center portion of the wick is longer than winding intervals of the coil at other portions of the wick, and winding intervals of the coil at intermediate portions of the wick are longer than winding intervals of the coil at the both end portions of the wick.

* * * * *